(12) United States Patent
Xu et al.

(10) Patent No.: US 11,730,072 B2
(45) Date of Patent: Aug. 22, 2023

(54) HARVESTING AND SOWING INTEGRATED COMPOUND OPERATION MACHINE

(71) Applicant: Jiangsu University, Jiangsu (CN)

(72) Inventors: Lizhang Xu, Jiangsu (CN); Tiaotiao Chen, Jiangsu (CN); Yixin Sun, Jiangsu (CN); Yaoming Li, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/012,657

(22) PCT Filed: Jun. 30, 2020

(86) PCT No.: PCT/CN2020/099142
§ 371 (c)(1),
(2) Date: Dec. 23, 2022

(87) PCT Pub. No.: WO2021/258412
PCT Pub. Date: Dec. 30, 2021

(65) Prior Publication Data
US 2023/0180646 A1    Jun. 15, 2023

(30) Foreign Application Priority Data

Jun. 24, 2020    (CN) .......................... 202010587829.1

(51) Int. Cl.
*A01B 49/06*    (2006.01)
*A01B 33/02*    (2006.01)
(Continued)

(52) U.S. Cl.
CPC .......... *A01B 49/065* (2013.01); *A01B 33/024* (2013.01); *A01B 43/00* (2013.01);
(Continued)

(58) Field of Classification Search
CPC ... A01B 49/022; A01B 49/065; A01B 33/024; A01D 43/12; A01D 43/14; A01D 41/127; A01D 45/04; A01C 7/06; A01C 7/006
See application file for complete search history.

(56) References Cited

U.S. PATENT DOCUMENTS 4,078,626 A * 3/1978 Weichel ................. A01D 67/00
                                                          111/131
4,525,988 A * 7/1985 Harlan .................... A01D 41/12
                                                          111/926
(Continued)

FOREIGN PATENT DOCUMENTS

| CN | 201550408 | 8/2010 |
|---|---|---|
| CN | 103299734 | 9/2013 |

(Continued)

OTHER PUBLICATIONS

"International Search Report (Form PCT/ISA/210) of PCT/CN2021/119757", with English translation thereof, dated Mar. 15, 2021, pp. 1-4.
(Continued)

*Primary Examiner* — Alicia Torres
(74) *Attorney, Agent, or Firm* — JCIPRNET

(57) ABSTRACT

A harvesting and sowing integrated compound operation machine, including a combine harvester, a stubble cleaning device, a topsoil loosening device, a fertilization device, a rotary tillage and ditching device, a sowing device, a detection device, a first driving device, a second driving device and a control device, wherein the stubble cleaning device is mounted below a header of the combine harvester; and the topsoil loosening device, the fertilization device, the rotary tillage and ditching device and the sowing device are mounted at a rear of a chassis of the combine harvester.

3 Claims, 6 Drawing Sheets

(51) Int. Cl.

| | | |
|---|---|---|
| *A01D 43/12* | (2006.01) | |
| *A01D 43/14* | (2006.01) | |
| *A01B 49/02* | (2006.01) | |
| *A01C 7/06* | (2006.01) | |
| *A01C 7/00* | (2006.01) | |
| *A01D 41/127* | (2006.01) | |
| *A01D 45/04* | (2006.01) | |
| *A01D 41/12* | (2006.01) | |
| *A01B 43/00* | (2006.01) | |
| *A01B 63/10* | (2006.01) | |
| *A01C 5/06* | (2006.01) | |

(52) U.S. Cl.
CPC ............ *A01B 49/022* (2013.01); *A01B 63/10* (2013.01); *A01C 5/064* (2013.01); *A01C 7/006* (2013.01); *A01C 7/06* (2013.01); *A01D 41/127* (2013.01); *A01D 41/1243* (2013.01); *A01D 43/12* (2013.01); *A01D 43/14* (2013.01); *A01D 45/04* (2013.01)

(56) References Cited

U.S. PATENT DOCUMENTS

| | | | | |
|---|---|---|---|---|
| 4,607,580 A | * | 8/1986 | Monty, Jr. ............... | A01C 14/00 111/139 |
| 5,535,688 A | * | 7/1996 | Kaufman ............... | A01D 43/12 172/474 |
| 2019/0350124 A1 | | 11/2019 | Pitt | |

FOREIGN PATENT DOCUMENTS

| | | | |
|---|---|---|---|
| CN | 104255132 | 1/2015 | |
| CN | 104365202 | 2/2015 | |
| CN | 204305567 | 5/2015 | |
| CN | 204994230 | 1/2016 | |
| CN | 105874954 | 8/2016 | |
| CN | 208143835 | 11/2018 | |
| CN | 109392434 | 3/2019 | |
| CN | 109588065 | 4/2019 | |
| CN | 110199673 | 9/2019 | |
| CN | 210470201 | 5/2020 | |
| CN | 111316775 | 6/2020 | |
| DE | 3644767 A1 * | 12/1986 | ............. A01D 43/14 |
| DE | 4133551 A1 * | 4/1993 | ............. A01D 31/02 |
| DE | 4325469 A1 * | 2/1995 | ............. A01B 49/06 |

OTHER PUBLICATIONS

Qin et al., "Design and Experiment of Seeding System for Harvest Ditch and Stalk-disposing Machine", Chinese Society for Agricultural Machinery, vol. 48, Issue 5, May 2017, with English abstract, pp. 54-62.

Chen et al., "Improved design of straw-cutting type threshing mechanism of full-feeding combine harvester", Transactions of the Chinese Society of Agricultural Engineering, vol. 29, Issue 24, Dec. 2013, with English abstract, pp. 11-16.

Office Action of China Counterpart Application, with English translation thereof, dated Jan. 29, 2022, pp. 1-15.

Office Action of China Counterpart Application, with English translation thereof, dated Jul. 11, 2022, pp. 1-15.

* cited by examiner

HARVESTING AND SOWING INTEGRATED COMPOUND OPERATION MACHINE

CROSS-REFERENCE TO RELATED APPLICATION

This application is a 371 of international application of PCT application serial no. PCT/CN2020/099142, filed on Jun. 30, 2020, which claims the priority benefit of China application no. 202010587829.1, filed on Jun. 24, 2020. The entirety of each of the above—mentioned patent applications is hereby incorporated by reference herein and made a part of this specification.

TECHNICAL FIELD

The present disclosure relates to the technical field of agricultural machinery, and specifically to a harvesting and sowing integrated compound operation machine.

BACKGROUND

In China, most of winter rapeseed production areas are distributed in the Yangtze River Basin, accounting for up to 90% of the total production of the country. The paddy-upland rotation of rice-rapeseed or rice-rice-rapeseed is mainly adopted in these areas. For a long time, sowing in these areas has being affected by the harvesting time of preceding crops, soil compaction, scattered fields, etc. The low level of mechanization of rapeseed production leads to high production costs and low economic benefits, restricting the development of the rapeseed industry. Improving the level of mechanization of rapeseed sowing is an important way to reduce costs and increase the efficiency in rapeseed planting.

Rice generally matures from September to October, which period coincides with the sowing period of rapeseed. People can plant rapeseed in the field after harvesting rice. However, existing rapeseed compound operation machinery is usually hitched to a tractor. For example, for a multifunctional rape seeder disclosed in Chinese Patent ZL200920066064.6, after the combine harvester finishes harvesting, a tractor is required to drive the rapeseed compound operation machinery to the field to complete the fertilization, rotary tillage, ditching, sowing and other operations of rapeseed. As a result, the number of times of land rolling by agricultural machinery is increased, which makes soil more compact and increases the operation costs. Therefore, it is necessary to design a rapeseed compound operation machine hitched to a combine harvester to complete the harvesting of rice and the sowing of rapeseed at a time.

SUMMARY

In order to solve the above problems, the present disclosure provides a harvesting and sowing integrated compound operation machine, to lighten and simplify the operation mode. A stubble cleaning device is mounted below a conveying trough of a combine harvester. A topsoil loosening device, a fertilization device, a rotary tillage and ditching device, and a sowing device are mounted at a tail of a chassis of the combine harvester in a rear-mounted manner. According to the present disclosure, on the premise that the combine harvester normally operates, the complexity of manual operation is not increased, normal operation of the combine harvester is not affected, and operations of stubble cleaning, topsoil loosening, fertilizing, rotary tillage, ditching, sowing, chopped grass throwing, soil burying and the like can be completed at a time while rice is harvested, thereby reducing the number of times of land rolling by agricultural machinery, alleviating the soil compaction phenomenon and reducing the operation costs.

The following technical solutions are employed in the present disclosure. A harvesting and sowing integrated compound operation machine is provided, including a combine harvester, a stubble cleaning device, a topsoil loosening device, a fertilization device, a rotary tillage and ditching device, a sowing device, a detection device, a first driving device, a second driving device and a control device, where the stubble cleaning device is mounted in front of a chassis of the combine harvester, and the stubble cleaning device is respectively connected to a conveying trough and the chassis of the combine harvester; the topsoil loosening device, the fertilization device, the rotary tillage and ditching device and the sowing device are sequentially mounted on a frame connected to a rear of the chassis; the detection device is configured to detect a movement displacement of a header and transmit the movement displacement to the control device; the first driving device is configured to drive the stubble cleaning device to operate; the second driving device is configured to drive the fertilization device, the rotary tillage and ditching device and the sowing device to operate; and the control device is respectively connected to an operating lever of the combine harvester, the detection device, the first driving device and the second driving device.

In the above solution, the first driving device includes a first hydraulic motor and a first cylinder; the first hydraulic motor is configured to drive the stubble cleaning device to carry out stubble cleaning work; one end of the first cylinder is hingedly connected to the stubble cleaning device, and the other end of the first cylinder is hingedly connected to a bottom of the conveying trough of the combine harvester; and the stubble cleaning device is further hingedly connected to one end of a strut, and the other end of the strut is hingedly connected to the chassis of the combine harvester.

In the above solution, the second driving device includes a second hydraulic motor and a second cylinder; the second hydraulic motor is mounted on a transmission box on one side of the frame, the transmission box is respectively connected to a transmission shaft of the fertilization device and a transmission shaft of the rotary tillage and ditching device, the second hydraulic motor is configured to drive the fertilization device and the rotary tillage and ditching device to operate, and a driving force of the fertilization device is transmitted from the other end of the transmission shaft of the fertilization device to the sowing device, to drive the sowing device to operate; and a front end of the frame is hingedly connected to the chassis of the combine harvester, an upper end of the frame is hingedly connected to one end of the second cylinder, and the other end of the second cylinder is hingedly connected to the combine harvester.

In the above solution, the topsoil loosening device includes several topsoil loosening fertilization shovels; and the topsoil loosening fertilization shovels are mounted on a lower part of the frame, and the topsoil loosening fertilization shovels are located in front of a fertilizer discharge pipe of the fertilization device.

In the above solution, the rotary tillage and ditching device includes a rotary tillage blade and a ditching blade; the ditching blade is arranged in the middle of the rotary tillage and ditching device, the rotary tillage blade is arranged on two sides of the ditching blade, and a rotation diameter of the ditching blade is greater than that of the rotary tillage blade; and a soil baffle is arranged behind the rotary tillage blade, and no soil baffle is arranged behind the ditching blade.

In the above solution, the combine harvester is equipped with a grass chopper.

In the above solution, the harvesting and sowing integrated compound operation machine further includes a seed ditch opener and a seed drop pipe; the seed ditch opener is mounted on a lower part of the frame and located below the sowing device; and an upper end of the seed drop pipe is connected to the sowing device, and a lower end of the seed drop pipe is located on a rear surface of the seed ditch opener.

In the above solution, the detection device is a pull-rope displacement sensor; and the pull-rope displacement sensor is mounted on a base of a cylinder configured to control lifting of the header of the combine harvester, and a pull rope of the pull-rope displacement sensor is connected to a bottom of the conveying trough.

In the above solution, the control device is connected to the operating lever through a stroke switch.

In the above solution, the combine harvester is a rice combine harvester or a wheat combine harvester.

Compared with the prior art, the present disclosure has the following beneficial effects.

1. The harvesting and sowing integrated compound operation machine according to the present disclosure is fixedly hitched to the chassis of the combine harvester. The stubble cleaning device is mounted below the conveying trough of the combine harvester, and is in associated motion with the combine harvester through the detection device. The topsoil loosening device, the fertilization device, the rotary tillage and ditching device, and the sowing device are mounted at the tail of the chassis of the combine harvester in a rear-mounted manner, and are in associated motion with the combine harvester through the stroke switch. The present disclosure can achieve operations of rice harvesting, stubble cleaning, as well as topsoil loosening, fertilizing, rotary tillage, ditching, sowing, chopped grass throwing, soil burying and the like at a time while rice is harvested, and reduce the number of times of land rolling by agricultural machinery, thereby alleviating the soil compaction phenomenon and reducing the operation costs.

2. The associated motion between the harvesting and sowing integrated compound operation machine according to the present disclosure and the combine harvester is realized through the design of the detection device, the control device, etc., without increasing the complexity of manual operation or affecting normal operation of the combine harvester.

3. According to the present disclosure, through the combination with the grass chopper on the combine harvester, the crushed stalks are thrown into the field and covered on the rapeseed, to play a role of water storage and moisture conservation, which is more conducive to the growth of rape.

DETAILED DESCRIPTION OF THE EMBODIMENTS

Figure 1:
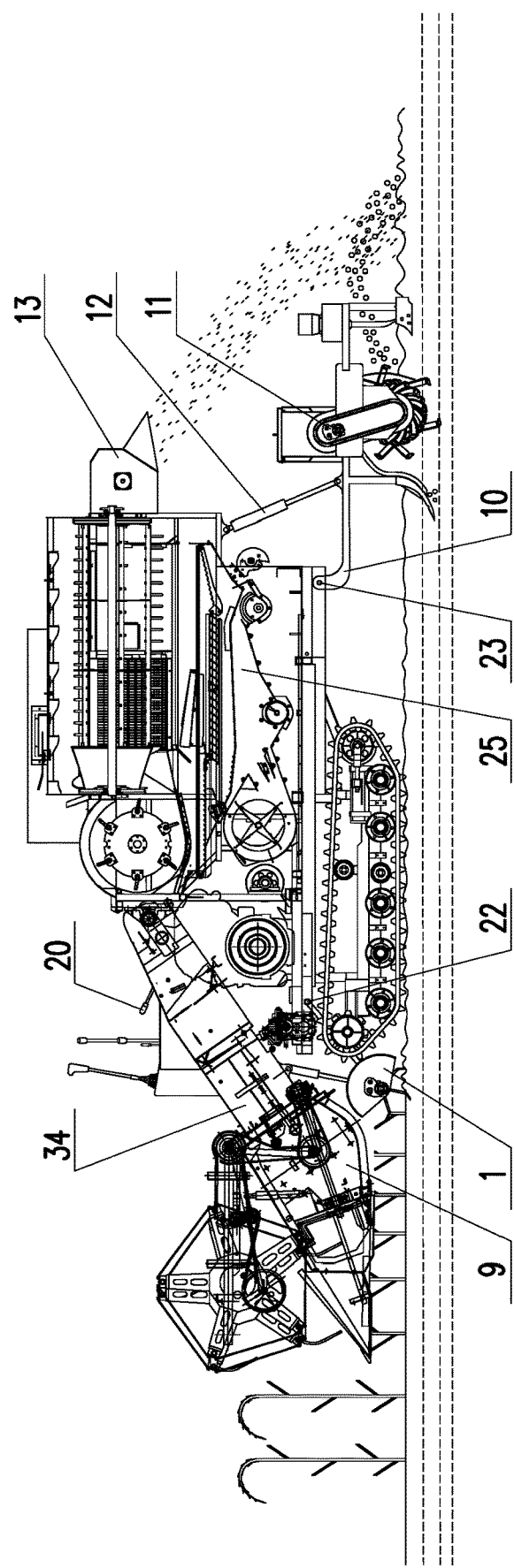
FIG. 1 is a state diagram of a harvesting and sowing integrated compound operation machine in normal operation according to an embodiment of the present disclosure.
Figure 2:
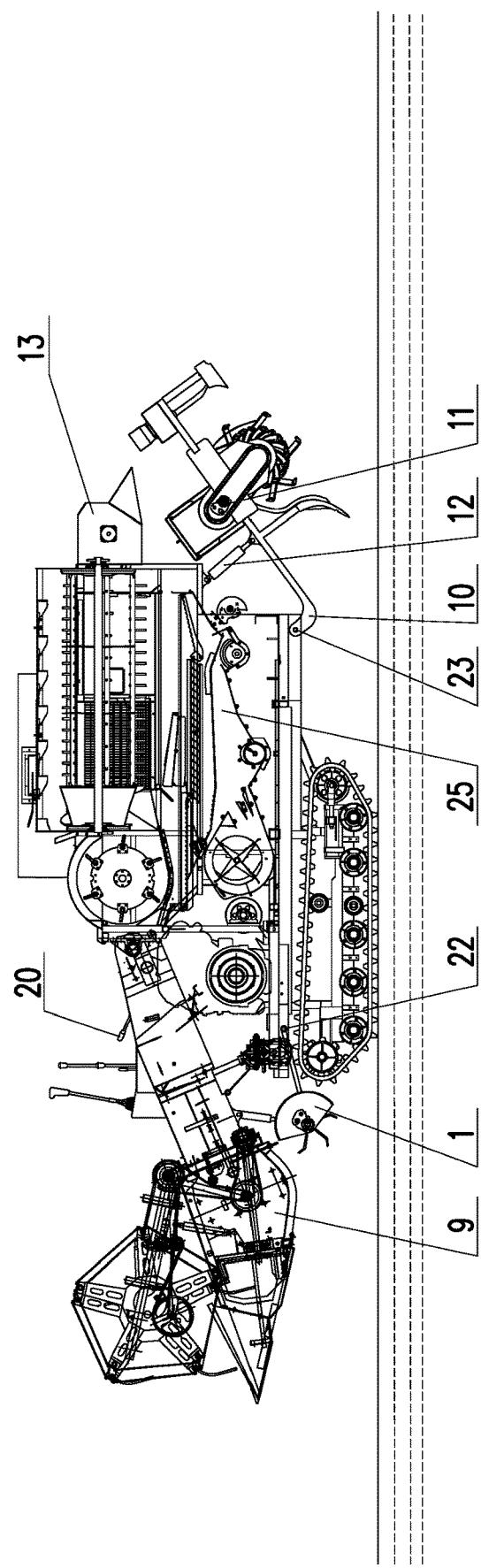
FIG. 2 is a state diagram of the harvesting and sowing integrated compound operation machine in a non-operating state according to an embodiment of the present disclosure.

Embodiments of the present disclosure will be exemplarily described in detail hereinafter with reference to accompanying drawings in which the same or like reference characters refer to the same or like elements or elements having the same or like functions throughout. The embodiments described below with reference to accompanying drawings are exemplary, and intended to explain, instead of limiting the present disclosure.

In the description of the present disclosure, it should be understood that the orientation or positional relationships indicated by the terms "center", "longitudinal", "transverse", "length", "width", "thickness", "upper", "lower", "axial", "radial", "vertical", "horizontal", "inner", "outer", etc. are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the present disclosure. Moreover, the terms "first" and "second" are used herein for purposes of description, and are not intended to indicate or imply relative importance or implicitly point out the number of the indicated technical feature. Therefore, the features defined by "first" and "second" may explicitly or implicitly include one or more features. In the description of the present disclosure, "plural" means two or more, unless it is defined otherwise specifically.

In the present disclosure, unless otherwise clearly specified and defined, the terms "mount", "connect", "couple", "fix" and variants thereof should be interpreted in a broad sense, for example, may be a fixed connection, a detachable connection, or an integral connection; may be a mechanical connection or an electrical connection; or may be a direct connection, an indirectly connection via an intermediate medium, or communication between the interiors of two components. For those of ordinary skill in the art, the specific meanings of the above terms in the present disclosure can be understood according to specific circumstances.

Embodiment 1

As shown in FIG. 1 to FIG. 6, a harvesting and sowing integrated compound operation machine includes a combine harvester 25, a stubble cleaning device 1, a topsoil loosening device 31, a fertilization device 2, a rotary tillage and ditching device 3, a sowing device 4, a detection device, a first driving device, a second driving device and a control device.

According to this embodiment, preferably, the combine harvester 25 is a rice combine harvester. The stubble cleaning device 1 is mounted in front of a chassis of the combine harvester 25, and the stubble cleaning device 1 is respectively connected to a conveying trough 34 and the chassis of the combine harvester 25. The first driving device is configured to drive the stubble cleaning device 1 to operate.

The topsoil loosening device 31, the fertilization device 2, the rotary tillage and ditching device 3 and the sowing device 4 are sequentially mounted on a frame 10 connected to a rear of the chassis. The second driving device is configured to drive the fertilization device 2, the rotary tillage and ditching device 3 and the sowing device 4 to operate.

The detection device is configured to detect a movement displacement of a header 9 and transmit the movement displacement to the control device. The control device is respectively connected to an operating lever 20 of the combine harvester 25, the detection device, the first driving device and the second driving device.

Figure 5:
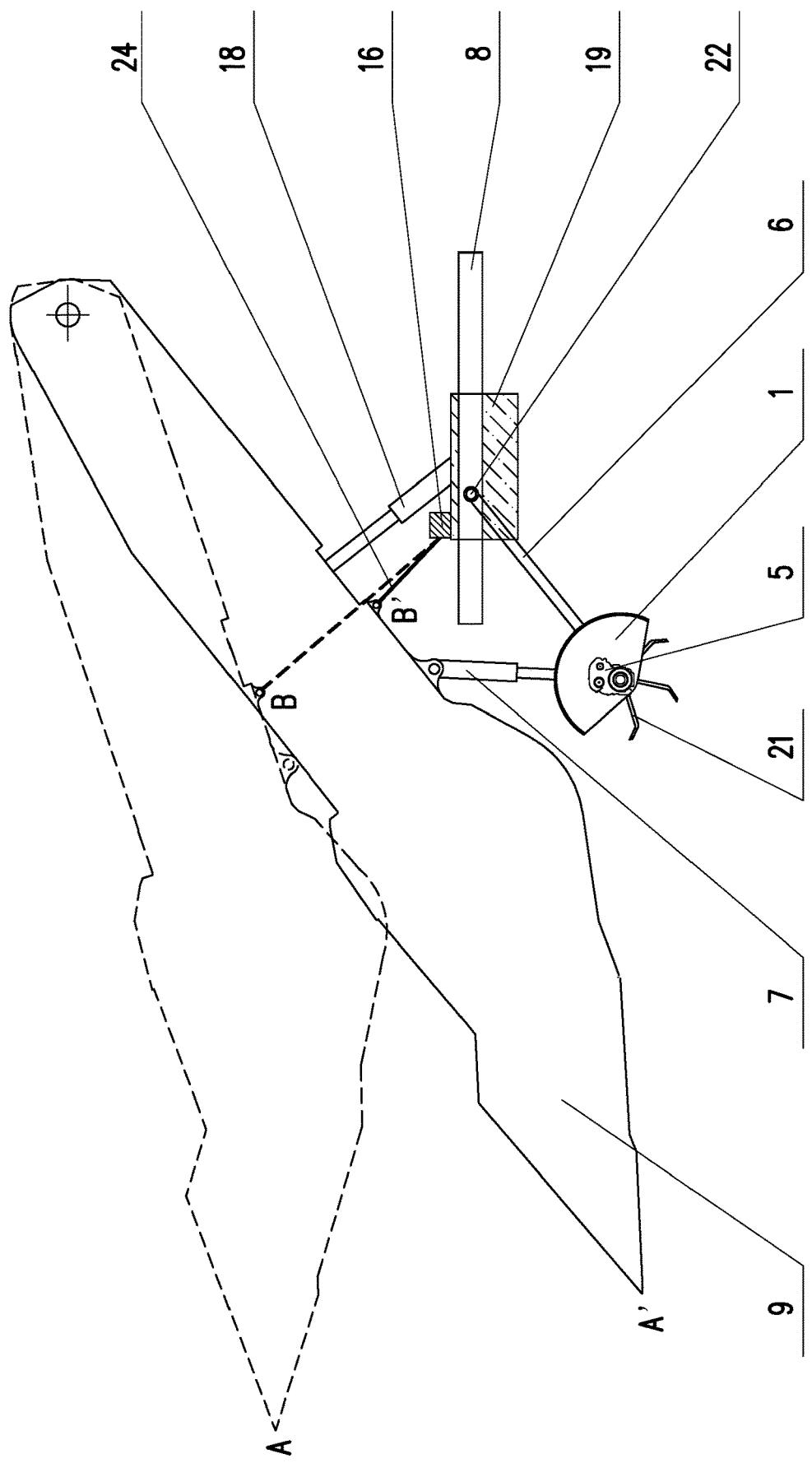
FIG. 5 is a diagram showing the working principle of the linkage between the stubble cleaning device and the combine harvester according to an embodiment of the present disclosure.

As shown in FIG. 1 and FIG. 5, according to this embodiment, preferably, the first driving device includes a first hydraulic motor 5 and a first cylinder 7. The first hydraulic motor 5 is configured to drive the stubble cleaning device 1 to carry out stubble cleaning work. One end of the first cylinder 7 is hingedly connected to the stubble cleaning device 1, and the other end of the first cylinder 7 is hingedly connected to a bottom of the conveying trough 34 of the combine harvester 25. The first hydraulic motor 5 and the first cylinder 7 are respectively connected to the control device through solenoid valves. The first cylinder 7 can axially extend and retract within a certain range. The stubble cleaning device 1 is further hingedly connected to one end of a strut 6, and the other end of the strut 6 is hingedly connected to the chassis 8 of the combine harvester 25 to form a first hinge point 22.

As shown in FIG. 1 to FIG. 4, according to this embodiment, preferably, the second driving device includes a second hydraulic motor 11 and a second cylinder 12. The second hydraulic motor 11 is mounted on a transmission box 32 on one side of the frame 10. The transmission box 32 is respectively connected to a transmission shaft of the fertilization device 2 and a transmission shaft of the rotary tillage and ditching device 3. The second hydraulic motor 11 is configured to simultaneously drive the fertilization device 2 and the rotary tillage and ditching device 3 to operate. A driving force of the fertilization device 2 is transmitted from the other end of the transmission shaft of the fertilization device 2 through a chain 33, to drive the sowing device 4 to operate. A front end of the frame 10 is hingedly connected to the chassis of the combine harvester 25 to form a second hinge point 23. An upper end of the frame 10 is hingedly connected to one end of the second cylinder 12, and the other end of the second cylinder 12 is hingedly connected to an outer frame of the combine harvester 25. The second hydraulic motor 11 and the second cylinder 12 are respectively connected to the control device through solenoid valves. The second hydraulic motor 11 and the second cylinder 12 are controlled and driven by the solenoid valves respectively. The second cylinder 12 can axially extend and retract within a certain range.

Figure 3:
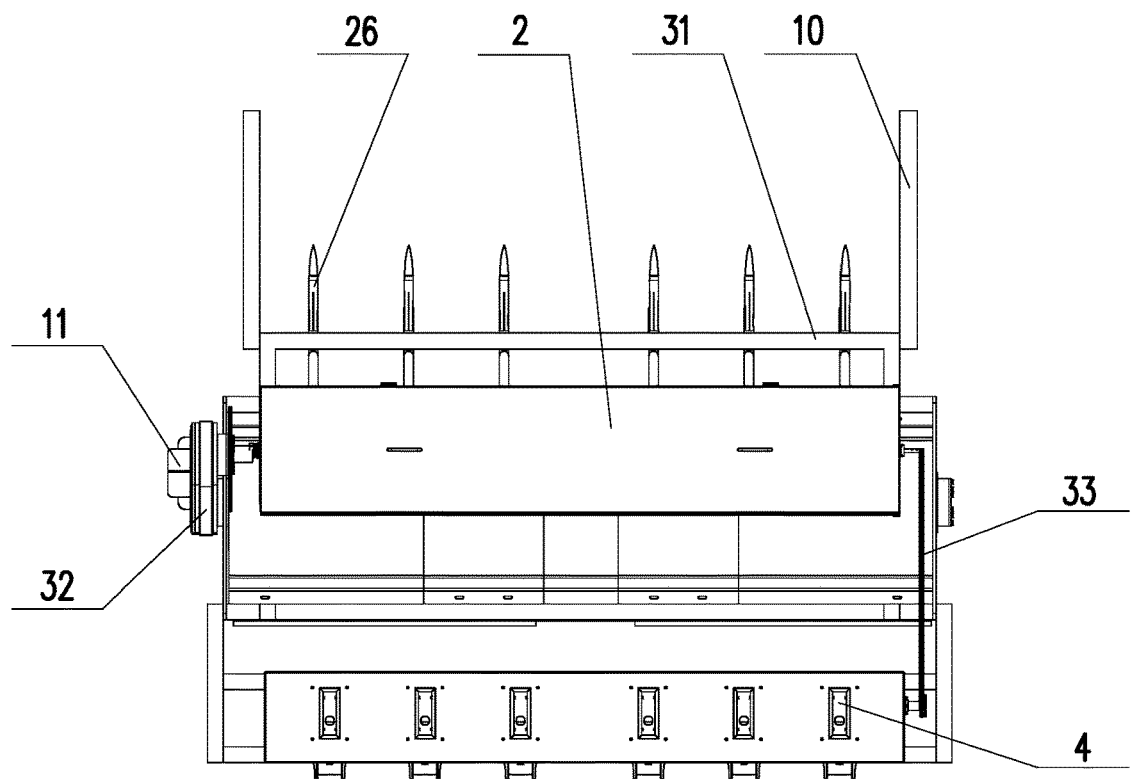
FIG. 3 is a top view of the harvesting and sowing integrated compound operation machine according to an embodiment of the present disclosure.
Figure 4:
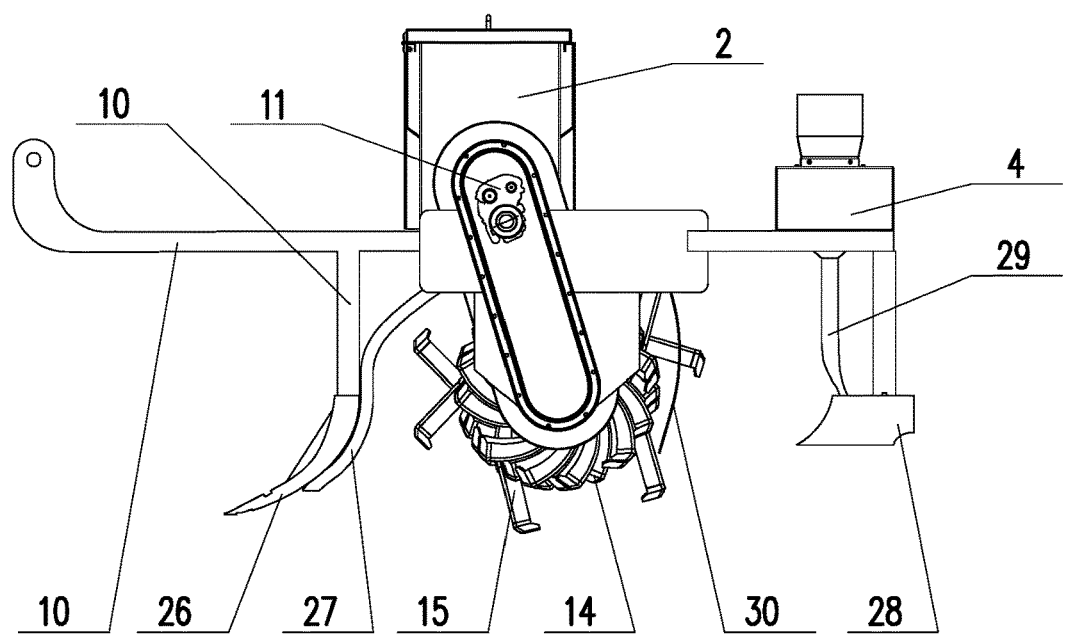
FIG. 4 is a left view of the harvesting and sowing integrated compound operation machine according to an embodiment of the present disclosure.

As shown in FIG. 3 and FIG. 4, according to this embodiment, preferably, the topsoil loosening device 31 includes several topsoil loosening fertilization shovels 26. The topsoil loosening fertilization shovels 26 are mounted on a lower part of the frame 10, and the topsoil loosening fertilization shovels 26 are located in front of a fertilizer discharge pipe 27 of the fertilization device 2.

According to this embodiment, preferably, the rotary tillage and ditching device 3 includes a rotary tillage blade 14 and a ditching blade 15 that are driven coaxially. The ditching blade 15 is arranged in the middle of the rotary tillage and ditching device 3. The rotary tillage blade 14 is arranged on two sides of the ditching blade 15. A rotation diameter of the ditching blade 15 is greater than that of the rotary tillage blade 14. A soil baffle 30 is arranged behind the rotary tillage blade 14, and no soil baffle 30 is arranged behind the ditching blade 15.

According to this embodiment, preferably, the sowing device 4 is connected to the seed ditch opener 28 through a seed drop pipe 29. An opening at a lower end of the seed drop pipe 29 is located in a three-dimensional space formed on a rear surface of the seed ditch opener 28. Mounting positions of the topsoil loosening fertilization shovels 26 and the seed ditch opener 28 relative to the frame 10 are not on the same straight line.

Figure 6:
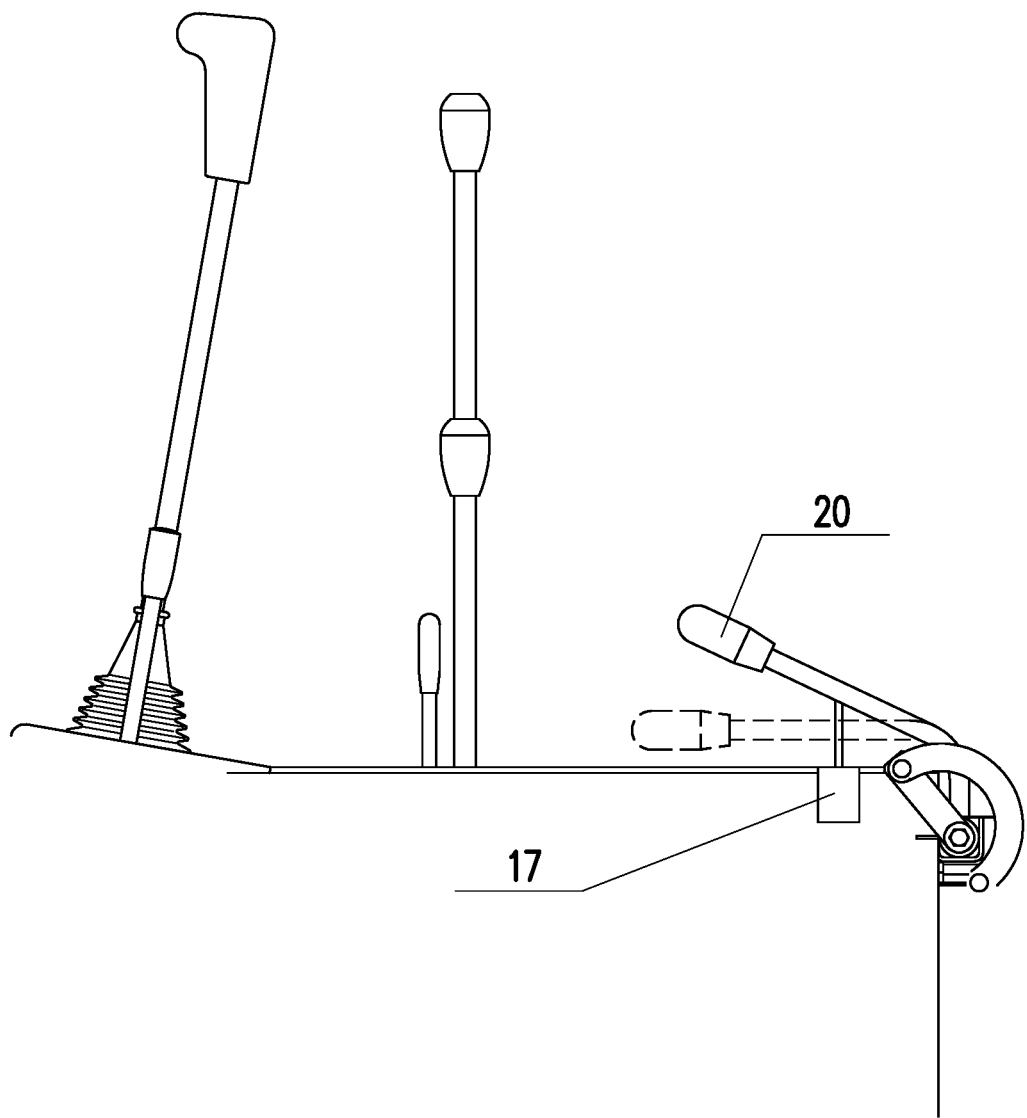
FIG. 6 is a diagram showing the working principle of the linkage between the topsoil loosening device, the fertilization device, the rotary tillage and ditching device, the sowing device, and the combine harvester according to an embodiment of the present disclosure.

As shown in FIG. 5 and FIG. 6, according to this embodiment, preferably, the detection device is a pull-rope displacement sensor 16. The pull-rope displacement sensor 16 is mounted on a base 19 of a cylinder 18 configured to control lifting of the header of the combine harvester 25. A pull rope 24 of the pull-rope displacement sensor 16 is connected to the bottom of the conveying trough 34. According to this embodiment, preferably, the control device is connected to the operating lever 20 through a stroke switch 17. When the header 9 descends from point A to point A', the pull rope 24 of the pull-rope displacement sensor 16 moves from point B to point B'. The points A and A' are respectively the highest point and the lowest point where the header 9 can operate normally. When the header 9 moves downward to the point A, the pull rope 24 of the pull-rope displacement sensor 16 is shortened to the point B, and a generated signal controls the solenoid valve to drive the first hydraulic motor 5 to start running and cause the first cylinder 7 to extend from a shortest state. When the header 9 is adjusted vertically between the point A and the point A', the pull rope 24 of the pull-rope displacement sensor 16 moves between the point B and the point B', and a generated signal controls the solenoid valve to drive the first cylinder 7 to extend or retract to ensure that the height of the stubble cleaning device 1 relative to the ground remains unchanged. When the header 9 moves upward to the point A, the pull rope 24 of the pull-rope displacement sensor 16 is extended to the point B, and a generated signal controls the solenoid valve to drive the first hydraulic motor 5 to stop running and cause the first cylinder 7 to retract to the shortest extent. The stroke switch 17 is mounted on the operating lever 20 that controls on/off of the power for threshing, cleaning and the like. When the operating lever 20 is pushed down, the power for threshing, cleaning and the like is turned on to start operation, the stroke switch 17 is switched on, and the second cylinder 12 is driven to extend to the longest extent through the control of the solenoid valve, and then the second hydraulic motor 11 starts running. When the operating lever 20 is pulled up, the power for threshing, cleaning and the like is turned off to stop operation, the stroke switch 17 is switched off, the second hydraulic motor 11 is controlled by the solenoid valve to stop running, and then the second cylinder 12 retracts to the shortest extent.

Figure 7:
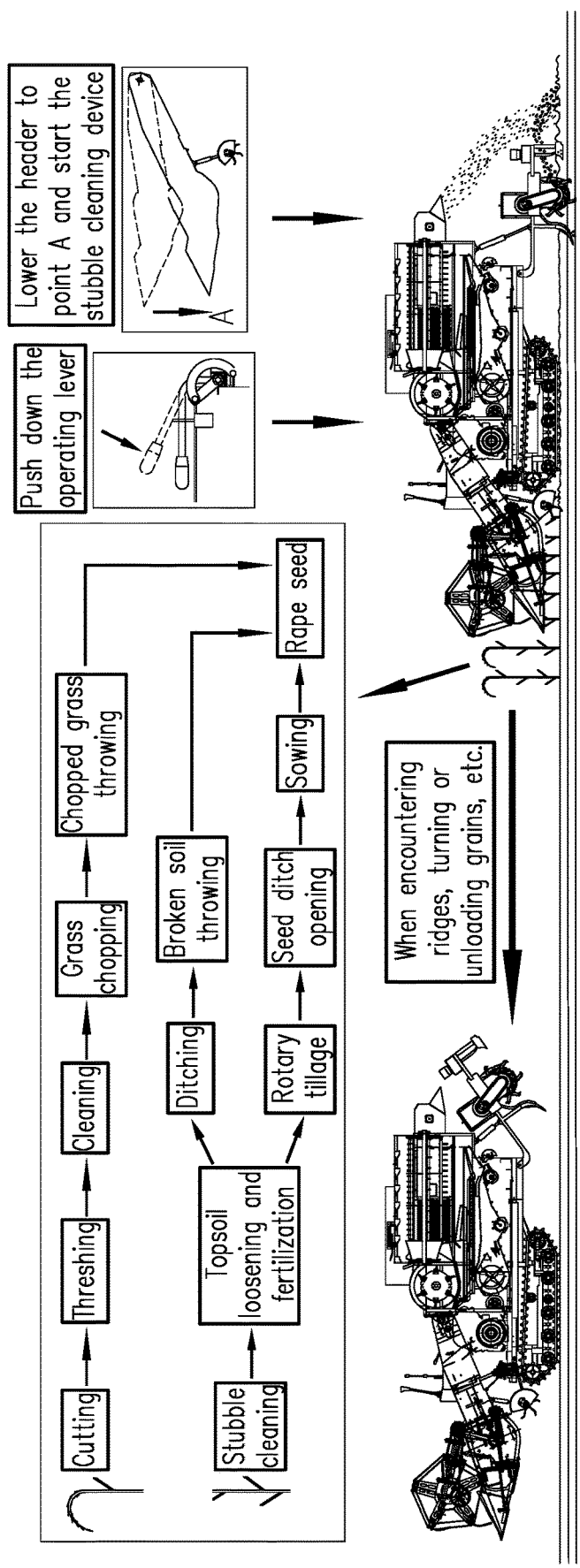
FIG. 7 is a flowchart showing operation of the harvesting and sowing integrated compound operation machine according to an embodiment of the present disclosure.

The working principle of the present disclosure is as shown in FIG. 7.

When the header 9 descends to below the point A, the first hydraulic motor 5 runs to drive the stubble cleaning blade 21 of the stubble cleaning device 1 to operate, the first cylinder 7 extends to the longest extent, and during the process where the header 9 descends and the first cylinder 7 extends, the stubble cleaning device 1 rotates counterclockwise about the first hinge point 22. The points A and A' are respectively the highest point and the lowest point where the header 9 can operate normally. When the header 9 is adjusted vertically between the point A and the point A', the pull rope 24 of the pull-rope displacement sensor 16 moves between the point B and the point B', and a generated signal controls the solenoid valve to drive the first cylinder 7 to extend or retract to ensure that the height of the stubble cleaning device 1 relative to the ground remains unchanged. The operating lever 20 is pushed down to cause the second cylinder 12 to extend to the longest extent. Then the second hydraulic motor 11 starts running to drive the fertilization device 2, the rotary tillage and ditching device 3 and the sowing device 4 to operate. During the process where the second cylinder 12 extends, the frame 10 rotates clockwise about the second hinge point 23 to enter a horizontal state.

When the combine harvester 25 travels normally in the field, ears of rice cut off by the cutter of the combine harvester flow into the header 9, and high stalks left are cut into low stalks by the stubble cleaning device 1. The ears of rice are threshed and cleaned, and the stalks are crushed by the grass chopper 13 and thrown into the field to cover the rapeseed seeds just sown. The topsoil loosening fertilization shovels 26 perform topsoil loosening operation on the seed bed belt after stubble cleaning, and a fertilizer discharged from the fertilization device 2 is conveyed to the back of the topsoil loosening fertilization shovels 26 through the fertilizer discharge pipe 27. As the combine harvester advances, the fertilizer is deeply buried in the soil. Immediately afterwards, the rotary tillage and ditching device 3 at the back performs rotary tillage on the surface of the seed bed and opens ditches in the middle. Soil thrown up during rotary tillage is blocked by the soil baffle 30, and soil thrown out during the opening of ditches by the ditching blade 15 covers the crushed stalks. Finally, the seed ditch opener 28 performs the seed ditch opening operation on the surface of the seed bed after rotary tillage, and rapeseed seeds discharged from the sowing device 4 are conveyed to the inside of the seed ditch opener 28 through the seed drop pipe 29, and then covered by the crushed stalks and the soil thrown out during the opening of ditches.

When the combine harvester 25 travels to an edge or ridge of the field or turns, or when the grain tank is full and grain unloading is required, the header 9 is manually controlled to ascend to above the point A, the first hydraulic motor 5 stops running, the stubble cleaning blade 21 stops operation, the first cylinder 7 retracts to the shortest extent, and during the process where the header 9 ascends and the first cylinder 7 retracts, the stubble cleaning device 1 rotates clockwise about the first hinge point 22. The operating lever 20 is pulled up to cause the second hydraulic motor 11 to stop running, so that the fertilization device 2, the rotary tillage and ditching device 3 and the sowing device 4 stop operation. Then the second cylinder 12 retracts to the shortest extent. During the retraction of the second cylinder 12, the frame 10 rotates counterclockwise around the second hinge point 23.

Embodiment 2

The main difference between Embodiment 2 and Embodiment 1 is that the combine harvester 25 is a wheat combine harvester.

It should be understood that although this specification is described in accordance with various embodiments, it does not mean that each embodiment only contains an independent technical solution. The description in the specification is only for clarity, and those skilled in the art should regard the specification as a whole, and the technical solutions in the embodiments can also be appropriately combined to form other implementations that can be understood by those skilled in the art.

The detailed descriptions listed above are merely specific illustrations of feasible embodiments of the present disclosure, and the protection scope of the present disclosure is not limited thereto. Equivalent embodiments or changes can be made without departing from the technical spirit of the present disclosure, which are all embraced in the protection scope of the present disclosure.

What is claimed is:

1. A harvesting and sowing integrated compound operation machine comprising a combine harvester, a stubble cleaning device, a topsoil loosening device, a fertilization device, a rotary tillage and ditching device, a sowing device, a detection device, a first driving device, a second driving device and a control device, wherein the stubble cleaning device is mounted in front of a chassis of the combine harvester, and the stubble cleaning device is respectively connected to a conveying trough and the chassis of the combine harvester; the topsoil loosening device, the fertilization device, the rotary tillage and ditching device and the sowing device are sequentially mounted on a frame connected to a rear of the chassis; the detection device is configured to detect a movement displacement of a header and transmit the movement displacement to the control device; the first driving device is configured to drive the stubble cleaning device to operate; the second driving device is configured to drive the fertilization device, the rotary tillage and ditching device and the sowing device to operate; and the control device is respectively connected to an operating lever of the combine harvester, the detection device, the first driving device and the second driving device; the combine harvester is a rice combine harvester;

the topsoil loosening device comprises several topsoil loosening fertilization shovels; and the topsoil loosening fertilization shovels are mounted on a lower part of the frame, and the topsoil loosening fertilization shovels are located in front of a fertilizer discharge pipe of the fertilization device;

the rotary tillage and ditching device comprises a rotary tillage blade and a ditching blade; the ditching blade is arranged in a middle of the rotary tillage and ditching device, the rotary tillage blade is arranged on two sides of the ditching blade, and a rotation diameter of the ditching blade is greater than that of the rotary tillage blade; and a soil baffle is arranged behind the rotary tillage blade, and no soil baffle is arranged behind the ditching blade;

the harvesting and sowing integrated compound operation machine further comprises a seed ditch opener and a seed drop pipe; the seed ditch opener is mounted on a lower part of the frame and located below the sowing device; and an upper end of the seed drop pipe is connected to the sowing device, and a lower end of the seed drop pipe is located on a rear surface of the seed ditch opener;

the first driving device comprises a first hydraulic motor and a first cylinder; the first hydraulic motor is configured to drive the stubble cleaning device to carry out stubble cleaning work; one end of the first cylinder is hingedly connected to the stubble cleaning device, and other end of the first cylinder is hingedly connected to a bottom of the conveying trough of the combine harvester; and the stubble cleaning device is further hingedly connected to one end of a strut, and other end of the strut is hingedly connected to the chassis of the combine harvester;

the second driving device comprises a second hydraulic motor and a second cylinder; the second hydraulic motor is mounted on a transmission box on one side of the frame, the transmission box is respectively connected to a transmission shaft of the fertilization device and a transmission shaft of the rotary tillage and ditching device, the second hydraulic motor is configured to drive the fertilization device and the rotary tillage and ditching device to operate, and a driving force of the fertilization device is transmitted from the other end of the transmission shaft of the fertilization device to the sowing device, to drive the sowing device to operate; and a front end of the frame is hingedly connected to the chassis of the combine harvester, an upper end of the frame is hingedly connected to one end of the second cylinder, and other end of the second cylinder is hingedly connected to the combine harvester; and the combine harvester is equipped with a grass chopper, and the grass chopper is arranged behind a threshing and cleaning part.

2. The harvesting and sowing integrated compound operation machine according to claim 1, wherein the detection device is a pull-rope displacement sensor; and the pull-rope displacement sensor is mounted on a base of a cylinder configured to control lifting of the header of the combine harvester, and a pull rope of the pull-rope displacement sensor is connected to a bottom of the conveying trough.

3. The harvesting and sowing integrated compound operation machine according to claim 1, wherein the control device is connected to the operating lever through a stroke switch.

\* \* \* \* \*